Jan. 31, 1967  W. A. WISEMAN  3,300,849
PACKING METAL GAS CHROMATOGRAPHY COLUMNS
Filed Oct. 8, 1963
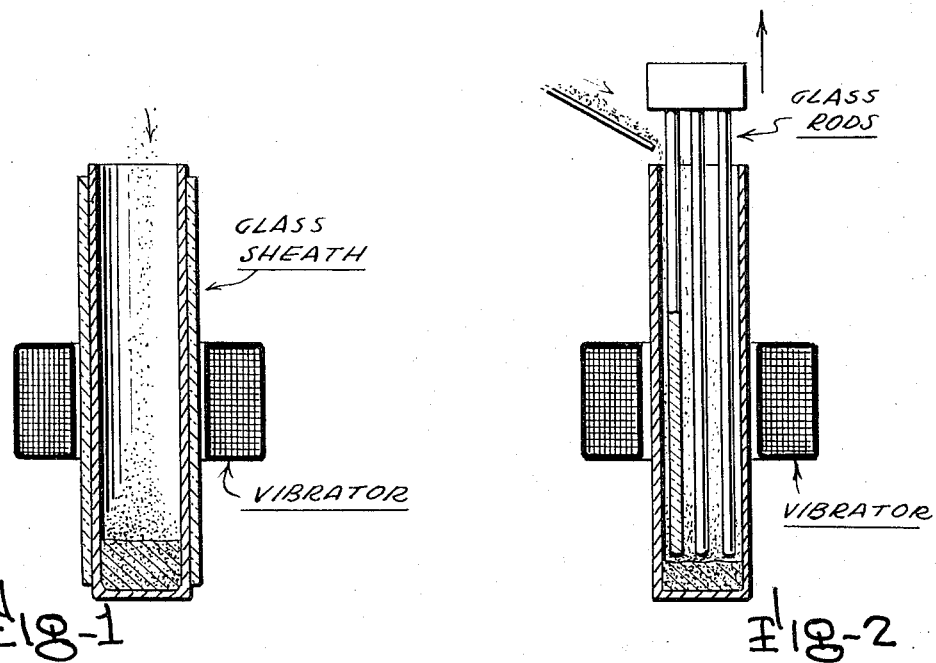
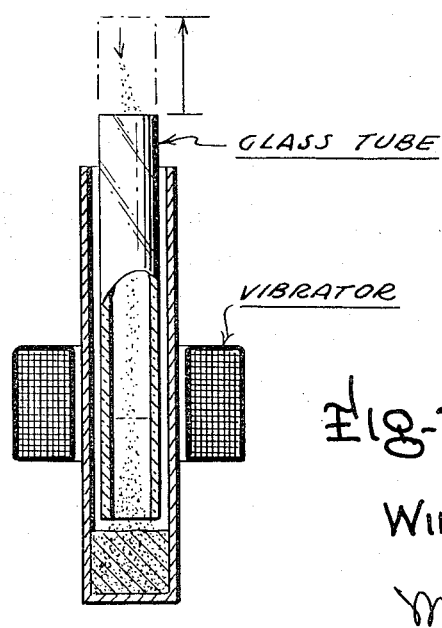
INVENTOR
WILLIAM ANTONY WISEMAN
BY Mason Fenwick & Lawrence
ATTORNEYS

3,300,849
PACKING METAL GAS CHROMATOGRAPHY COLUMNS
William Antony Wiseman, Maidenhead, England, assignor to Gas Chromatography Limited, Berkshire, England
Filed Oct. 8, 1963, Ser. No. 314,611
Claims priority, application Great Britain, Oct. 8, 1962, 37,963/62
10 Claims. (Cl. 29—424)

This invention relates to improvements in apparatus for gas chromatography and includes a method of making such apparatus.

The primary use of gas chromatography is to analyse mixtures of liquids and gases. Separation of the components of a material is effected by a number of methods, but one of the most favoured is by the use of so-called conventional partition column. This partition column comprises a tube into which is packed a material consisting mainly of an inert solid material, for example, Celite or C.22 Brick Dust with a small or large amount, depending on the circumstances, of a liquid partitioning agent. The better the separation which a given column will give between two components, the better the column, all other things being equal.

The separating power of the column is most conveniently measured by its so-called theoretical plates, and generally speaking most columns that are packed have between 200 and 500 theoretical plates per foot. The figure of 500 plates refers mainly to columns of 4 ft. long or less. For 6 ft., 8 ft., 10 ft. and 12 ft. columns, more than 500 plates per foot is looked upon as difficult to achieve though such columns may be good in practice. Any packed column, whether long or short, with 10,000 plates or more in all is regarded as a good column but difficult to make.

A further feature of a column which is important in deciding whether it is a good column or not, but which is not always immediately apparent as the problem does not arise until columns of more than 5,000 plates are required, is the question of the pressure drop, across the column i.e. the differential pressure required to maintain a reasonable rate of gas flow. If in attaining a given efficiency the pressure drop across the column is excessive, it will not be possible to make a very long column, that is a very efficient column. In general, the efficiency of a column increases linearly with length but there is a limit to this, usually about when the ratio of the inlet to the outlet pressure exceeds a factor of about 3 to 1. It will then be found that increasing the length of columns does not produce a corresponding increase in performance. While any longer column is always more efficient than a shorter one continued increasing of the length of the column has less and less effect on the efficiency, the additional length becoming eventually practically useless. To overcome this problem, it is usual to raise the pressure both at the inlet and the outlet of the column, thus reducing the inlet/outlet pressure ratio. Even in this case the device is rendered progressively less useful as the total pressure in the system approaches reasonable practical limitations. The technique is generally not entirely satisfactory. All these considerations have been given precise meaning in the shape of a factor related to column performance called the performance index which, in an approximate form is defined as follows:

$$P.I.= \frac{30.7 \times (\text{pressure drop across the column}) \times (\text{air peak time})}{(\text{number of theoretical plates})^2}$$

Where air peak time means the time it takes for an unabsorbed component to reach the detector from the time of injection. An ordinary packed column has a performance index very much in excess of 100. Figures of 1000 or more are quite common.

This invention permits the manufacture of columns of the conventional packed type with performance indices of around 30, or even less, and/or with plate efficiencies of 10,000 plates or more and/or with 600 to 1100 plates per foot.

Hence, in addition to making possible good columns with a large number of plates per foot, this invention enables columns to be made with a low performance index and hence very high total efficiencies even if the columns are very long for, despite their length, they will have a small pressure drop. It is an advantage to make a column which has both a large number of plates per unit length and a low performance index, but this is not always possible, even using the invention. None the less the invention allows very high efficiency columns to be made.

The conventional method of making a column is as follows:

A suitable material such as Celite of about 100 mesh fineness is mixed with the proportion of a stationary phase such as Squalane.

Suitable proportions can be: Celite—1 part by weight, Squalane—from 0.01 to 0.5 part by weight.

The Squalane is dissolved in a volatile liquid and the solution is mixed with the Celite. The volatile liquid is evaporated leaving the Celite coated with Squalane. The column which may be a tube of any of the conventional materials such as brass, copper, stainless steel or glass of bore between 1 mm. (or sometimes less) up to at least 100 mm. and between a few inches and 20/30 feet in length. Usual diameters are about 2 to 4 mm. and 3/6 feet long. The Celite is poured into the column which is vibrated by a suitable mechanical or electrical device until the column is full. The ends of the column are filled with a suitable material such as glass wool to prevent the Celite falling out.

It is a fact observed by me that for a given column, with an internal diameter of, for example, 4 mm. or 5 mm., a glass column will pack more efficiently than a metal one. It has become apparent as a result of work in this field that the reason for this is that the vibrations which are used to obtain a good packing are not transmitted so readily along a copper or stainless steel column as they are along a glass one. The effect is that only a small proportion of the column being packed in metal is being adequately vibrated. As the column gets larger, of course, it becomes more and more difficult for the vibrations to transmit themselves through the Celite in order to obtain a good packing.

According to the invention there is provided a method of making tubular metal partition columns for gas chromatography in which the vibrations necessary to pack columns with the desired efficiency are transmitted to the material in the columns by glass.

A full and complete understanding of the invention may be had upon reading the following description of the invention, accompanied by the drawing, wherein, FIGURE 1 is a cross sectional view disclosing the embodiment of the invention, wherein a glass sheet is provided for the metal tube;

FIGURE 2 is a cross sectional view partly broken away, disclosing another embodiment of the present invention, wherein glass rods are utilized for packing the packing material, and FIGURE 3 is a cross sectional view partly broken away disclosing another embodiment of the present invention, wherein the packing material is in part fed through the glass tube.

The glass may be in the form of a sheath on a metal tube which contains the material, or glass rods or tubes may be inserted in the column and withdrawn as the packing proceeds. Or both methods may be used, for example, for a column of large diameter.

Further the invention comprises partition columns made by the aforesaid methods.

The glass sheathing can be effected by pushing the metal tube into a glass tube, from which it might possibly be withdrawn at the end of the process, or, by melting glass on to the metal tube and cracking it off when the process is complete. A glass tube could be cracked off in the same way.

If desired one or more glass rods or tubes may be placed in the metal tube and vibrated as the filling of the column proceeds and such rods are withdrawn at about the same rate as the filling takes place, ensuring of course that material lower down is properly packed before the rods leave it. This variant of the process is particularly useful for tubes of large diameter, say 1" or more as the glass rods or tubes can be positioned near the axis of the metal tube so that the vibrations are transmitted to the axial material while the vibrations of the external glass sheath are transmitted to the material nearer the tube wall. Conveniently glass tubes used to vibrate the material near the axis can be used to feed the material down into the column, said tubes being steadily withdrawn as the column fills. Normally one such glass tube would be sufficient.

The vibrations may be imparted electrically or mechanically and broadly speaking vibrations of high frequency and energy are desirable so that they penetrate deeply into the material.

Yet another method is to pour the Celite into a glass tube inside a metal tube, vibrating both, and to withdraw the glass tube slowly which will allow the metal tube to fill. In all these ways the vibrations are transmitted to the Celite and a better packing is obtained.

For the purpose of explaining the invention more fully, several examples are given below.

*Example 1*

A metal tube to contain the material comprising the actual chromatography column is sheathed on its exterior with glass. The tube is then slowly filled with material while the tube is continuously vibrated. A suitable material is Celite of, say, 100 mesh fineness and this is mixed with a solution of Squalane. Suitable proportions are Celite 1 to Squalane ⅕ to ⅒ by weight. The Squalane is dissolved in a volatile liquid and mixed with the Celite to a slurry, whereafter the liquid is evaporated leaving the Celite impregnated with Squalane.

*Example 2*

A 3' copper tube with a 2 mm. bore was taken and packed with Celite. This column gave about 1600 plates. The same Celite was taken and poured into a tube exactly similar to the previous one except that it had a glass sheath sealed on the outside. It was packed in the identical way and the number of plates was about 2400 and the performance index was about 28.

*Example 3*

A 6 foot ¼" copper tube was taken and filled with brick dust. The number of plates obtained was about 2400. A similar tube was then taken, but before being filled with brick dust, was coated with glass on the outside. This column when tested gave about 3600 plates.

*Example 4*

A ¼ foot 3" stainless steel column was packed with 100/120 mesh Celite coated with 15% Squalane and gave about 1000 plates. A similar column was packed by inserting a glass tube into the column and vibrating this as well as the metal tube: a column with 1300 plates was obtained.

These examples are selected out of many dozens of tests giving similar results, all of which show a similar improvement of performance. They are only given by way of illustration and are not given in any way to limit the invention.

This invention enables columns with an efficiency (that is, the number of theoretical plates per foot) of 800, 900, 1,000 or more plates per foot to be constructed readily and, furthermore, the efficiency does not appear to fall off markedly at long lengths. Hence, a 12 ft. column can contain over 11,000 theoretical plates. A further point in connection with packing metal columns as hitherto practised is that the larger the diameter the less efficient the packing.

This invention enables fairly large diameter columns to be packed with an efficiency equal to that with which smaller diameter columns are packed.

The process is applicable to any partition column using any of the materials known for the purpose. For instance, another suitable filler is a polytetrafluoroethylene polymer, finely ground. In short any materials known for this purpose may be employed and liquids other than the Squalane solution can be used.

The process is applicable to columns from the smallest size (a fraction of a millimeter) up to any size required.

I claim:

1. A method of filling a partition column formed from a metal tube for gas chromatography with a packing material consisting of an inert solid material and a liquid partition agent, which comprises the steps of providing a metal tube, placing a glass member which will be in energy transmitting relationship with the material to be packed, feeding the packing material into the tube, initiating vibrations in the glass member to effect the packing of the packing material, stopping the flow of the packing material, and removing the glass member.

2. A method as claimed in claim 1, wherein the vibrations are initiated in the glass member to effect the packing of the material so that the apparatus of the packed column exceeds 800 theoretical plates per foot.

3. A method as claimed in claim 8, in which the glass tube is removed by withdrawing it from the tube.

4. A method as claimed in claim 1, in which the glass member comprises a glass rod or glass tube inserted in the metal tube, the said member being withdrawn as the packing operation proceeds.

5. A method as claimed in claim 1, in which the glass member comprises a glass sheath around the tube and a glass rod or tube inserted in the metal tube.

6. A method as claimed in claim 1, in which the glass member includes at least one glass tube inserted in the metal tube, wherein at least part of the packing material is introduced into the metal tube through said glass tube.

7. The process of claim 1, wherein the glass member comprises at least one glass rod or tube and includes the steps of inserting said glass rod into said metal tube and withdrawing the rod at about the same rate as said packing material is fed into said tube.

8. A method as claimed in claim 1, wherein the glass member comprises a glass sheath around the metal tube.

9. A method as claimed in claim 8, wherein the glass sheath is removed by cracking it off the tube.

10. The process of claim 8, wherein the glass sheath is formed by the step of melting glass on to the metal tube.

References Cited by the Examiner

UNITED STATES PATENTS

| | | |
|---|---|---|
| 2,645,836 | 7/1953 | Sorensen et al. |
| 3,067,117 | 12/1962 | Hauth et al. _____ 53—126 X |
| 3,164,980 | 1/1965 | Loyd _____ 55—386 X |

JOHN F. CAMPBELL, *Primary Examiner.*

P. M. COHEN, *Assistant Examiner.*